United States Patent [19]
Fiedler

[11] 3,859,713
[45] Jan. 14, 1975

[54] METHOD OF MANUFACTURING SLOTTED SIEVES

[75] Inventor: Bernhard Fiedler, Grevenbroich, Germany

[73] Assignee: Maschinenfabrik Nuckau R. Wolf Aktiengesellschaft, Grevenbroich, Germany

[22] Filed: June 25, 1973

[21] Appl. No.: 373,439

[30] Foreign Application Priority Data
June 26, 1972 Germany............................ 2231269

[52] U.S. Cl. ............ 29/423, 29/163.5 CW, 29/424, 29/472.1
[51] Int. Cl. ............................................ B23p 17/00
[58] Field of Search..... 29/423, 163.5 F, 163.5 CW, 29/472.1, 424, 475

[56] References Cited
UNITED STATES PATENTS

| | | | |
|---|---|---|---|
| 2,323,713 | 7/1943 | Harmon..................... | 29/163.5 CW |
| 2,857,657 | 10/1958 | Wheeler, Jr. .............. | 29/163.5 F X |
| 3,123,446 | 3/1964 | Wheeler, Jr. .............. | 29/163.5 F X |
| 3,273,226 | 9/1966 | Brous et al.................. | 29/423 X |
| 3,626,581 | 12/1971 | Weinland..................... | 29/424 |

Primary Examiner—C. W. Lanham
Assistant Examiner—Victor A. DiPalma
Attorney, Agent, or Firm—Michael S. Striker

[57] ABSTRACT

A plurality of profiled elements is coated with protective layers whose thickness corresponds to one-half of the desired width of the slots of a sieve to be assembled from such elements. These elements are juxtaposed on a support having the general shape of the sieve to be obtained so that the protective layers of any two adjacent elements abut each other, and secured to the support. Portions of the protective layers are removed in the regions of intended junctions and the elements are interconnected by electroplating, welding or glueing, thus forming a self-supporting sieve body. The remaining portions of the protective layers are removed to form voids between the elements to subsequently serve as sieve slots, with concurrent or preceding removal of the support.

13 Claims, 21 Drawing Figures

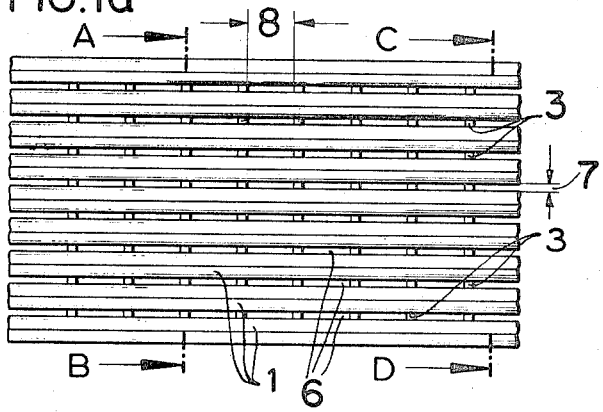 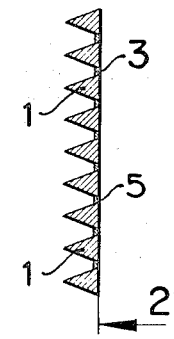 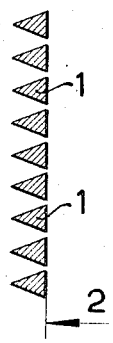
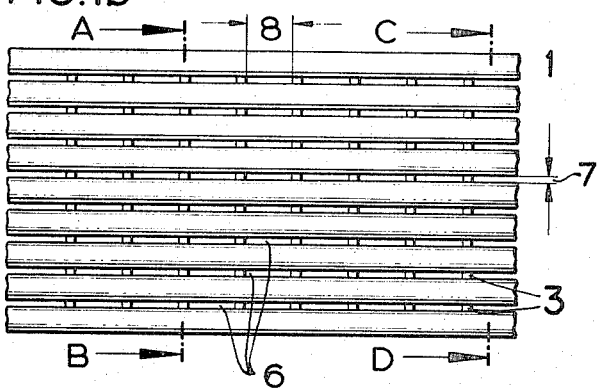 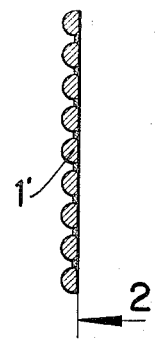 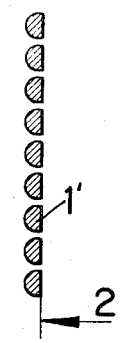
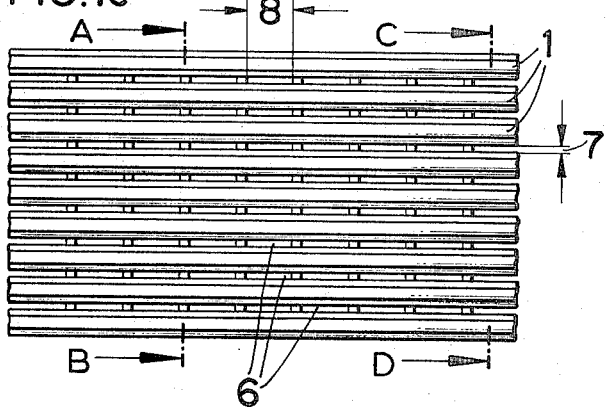 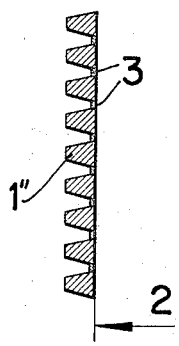

FIG. 4
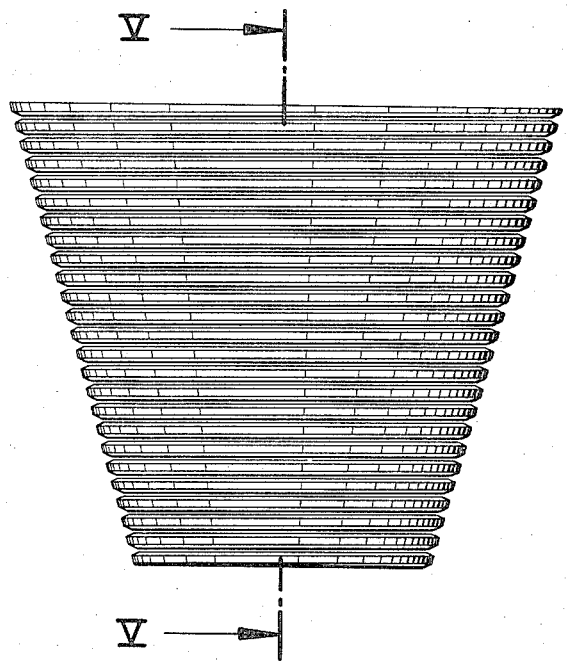
FIG.5a  FIG.5  FIG.5b
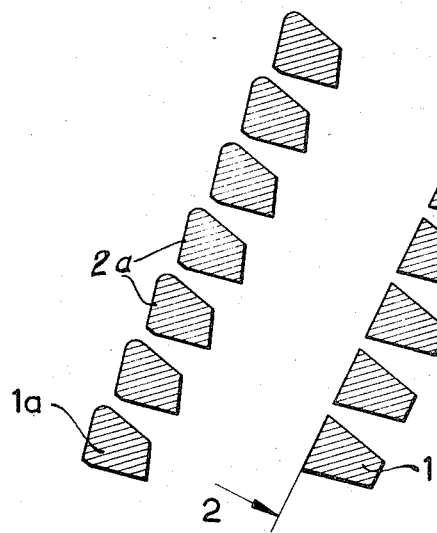
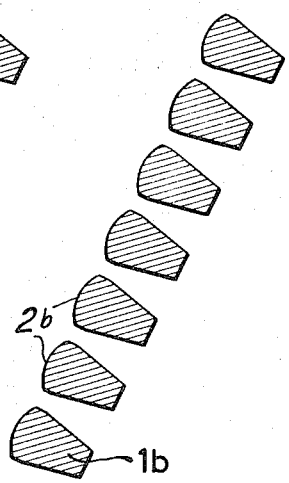

METHOD OF MANUFACTURING SLOTTED SIEVES

BACKGROUND OF THE INVENTION

The invention relates to a method of manufacturing slotted sieves from profiled elements, particularly from wire, filament or rod sections.

Slotted sieves are already in general use in various fields, particularly as sieve cages or baskets, rotating cages in pumps and boring mills, or as centrifugal drums for centrifuges, and they are usually manufactured by arranging an array of profiled elements on a core or support so as to form an uninterrupted surface, interconnecting such elements so as to form a sieve body, and subsequently converting such body into a sieve by manufacturing fine slots therein.

One of the known processes for manufacturing slotted sieves utilizes profiled wires or rods having inclined flanges. These profiled elements are arranged in such a manner that they abut each other and form an uninterrupted sieve surface, and the fine sieving slots are produced in this surface by chip-removing operations, such as cutting or grinding, after permanently interconnecting the elements to form a sieve body.

However, this manufacturing process is disadvantageous, in particular if slotted sieve cages of considerable dimensions are to be manufactured, since the sieve body offers only a minimum resistance to the forces occurring during the chip removing operations, even if the dimensions of the profiled elements are large. As a result of the low resistivity of the material of the elongated elements or the interconnected sieve body to the cutting or grinding forces acting on the elements perpendicularly to their length, the elements are being deflected by such forces so that positive contact of the cutting or grinding tool with the surface to be machined cannot be assured, so that the width of the fine slots produced in the sieve body by removing part of the surface thereof is non-uniform. A further disadvantage of this process is the difficulty encountered when such a sieve body has to be clamped into the chip-removing machine because of the danger of deforming the sieve body by the clamping forces. A further disadvantage arises if such a sieve body comprising profiled elements having relatively large dimensions is to be welded, since the stresses in the individual elements resulting from heat treatment during the welding operation result in buckling of the sieve body, so that rotational symmetry of the sieve body which is necessary for the chip-removing operation and the function of the sieve cannot be achieved. In any case, the additional irregularities of the shape of the sieve body caused by the thermal stresses result in aggravation of the irregularities of the dimensions of the sieve slots on top of the aformentioned irregularities resulting from deformation of the elements by the machining forces. In addition to the above described non-uniformity of the slots, all of these factors also have a detrimental effect on the dynamic balance of the so manufactured sieve, so that the sieve cages manufactured in accordance with the just described method are unsuitable for use in centrifuges operating at high rotational speeds.

Experience has shown that dynamically balanced operation of the centrifugal drum is a necessary condition a smooth operation of continuously operating sugar centrifuges. It has also been found that the same condition is valid for covering sieves to be used in continuously operating highspeed sugar centrifuges.

The field of production of covering sieves to be used in centrifuges has been subject to rapid development in the last 30 years, and many processes have been proposed contemplating a faultless production of such sieves. In most instances, such sieves are being mechanically produced from wires, filaments or metal sheets. However, the requirement of small slot widths or opening sizes imposes limitations on such sieves, since the achievable slot or opening sizes are determined by the wire diameter or the sheet thickness. Namely, if small openings are desired, the wire diameter or the sheet thickness have to be comparatively small. However, this results in low resistivity to outside forces and in short life span of such a sieve, so that the known covering sieves have to be exchanged several times during the sugar producing period.

It is also already known to manufacture relatively small openings in sieves by controlled electron beams, laser beams, or by spark erosion. However, such methods are economically feasible only for production of openings in relatively thin sheets because of the large number of such openings and relatively large areas which have to be provided with such openings. However, it has been already mentioned that such sieves which are produced from thin sheets are particularly disadvantageous as far as their durability is concerned.

In view of the aforementioned disadvantages of the mechanical processes for production of covering sieves, two chemical methods have found increasing use in the past years for economical production of covering sieves, namely chemical etching and electroplating. However, even these methods are disadvantageous since the opening diameters or slot widths depend on the sheet thickness. In view of practical considerations, it is not feasible to produce sieving sheets with openings smaller than 0.04 millimeters, and the sheet thickness of such sieves is smaller than 0.2 millimeters and the area of the openings amounts to less than 7% of the area of the sieve.

The free sieve area, i.e., the sum of the areas of the openings, determines the throughput of the centrifuge, that is the amount of dry substance and fluid which can be separated per time unit. Namely, the larger the free sieve area, the larger is the throughput.

If the size of the openings is between 0.06 and 0.1 millimeters, the maximum attainable sheet thickness amounts to only 0.3 millimeters. This relatively small sheet thickness results in high sensitivity of the covering sieve to detrimental influences, particularly if such sieves are used in continuously operating high-speed sugar centrifuges. In addition to the wear of such a sieve resulting from the abrasion thereof by sugar crystals, the sieve is often being damaged or destroyed by sugar clusters or small impurities. However, even small cracks or holes in the sieve result in a necessity of removing such an expensive sieve from operation because of the occurrence of high losses of valuable sugar substance.

A further disadvantage of the known sieve sheets is to be seen in the fact that only such shapes of the sieves can be produced which can be developed into a plane, such as cylinders or cones or similar configurations, while other shapes, such as barrels, stepped or corrugated or other nonevolvable configurations cannot be obtained.

SUMMARY OF THE INVENTION

Accordingly, it is an object of the present invention to avoid the disadvantages of the prior art.

In particular, it is an object of the present invention to produce a slotted sieve having narrower slots than the sieves manufactured in accordance with the heretofore known methods.

A concomitant object of the invention is to provide a slotted sieve having sufficient thickness so as to increase the life span of such sieve and avoid shutdowns of equipment during the sugar producing period for sieve exchange, and to reduce losses of valuable sugar substance.

A further object of the invention is to provide a relatively sturdy construction of a sieve for sugar centrifuges which can be used continuously as either a sieve cage or as a covering sieve.

Still another object of the invention is to devise a method of production of a sieve which is both inexpensive and reliable while assuring uniformity of the produced slots and maximum attainable free sieve area.

In pursuance of the above objects, and others which will become apparent hereinafter, the invention resides in providing the profiled elongated elements from which the sieve is to be produced with a covering layer of dissolvable material whose thickness amounts to one-half the width of the contemplated slots, arranging the elements on a support in an array so that the layers of adjacent elements abut each other and an uninterrupted surface is created, interconnecting the elements so as to form a sieve body, and removing the soluble layers so as to provide voids between the elements, subsequently serving as sieve slots of the sieve.

The novel features which are considered as characteristic for the invention are set forth in particular in the appended claims. The invention itself, however, both as to its construction and its method of operation, together with additional objects and advantages, will be best understood from the following description of specific embodiments when read in connection with the accompanying drawing.

BRIEF DESCRIPTION OF THE DRAWING

FIG. 1a is a partial top plan view of a slotted sieve on an enlarged scale;

FIG. 1aa is a cross-sectional view taken along the line A-B of FIG. 1a;

FIG. 1aaa is a cross-sectional view taken along the line C-D of FIG. 1a;

FIG. 1b is a partial top plan view of a different embodiment of a slotted sieve in an enlarged scale;

FIG. 1bb is a cross-sectional view taken along the line A-B of FIG. b;

FIG. 1bbb is a cross-sectional view taken along the line C-D of FIG. 1b;

FIG. 1c is a partial top plan view of another embodiment of a slotted sieve on an enlarged scale;

FIG. 1cc is a cross-sectional view taken along the line A-B of FIG. 1c;

FIG. 1ccc is a cross-sectional view taken along the line C-D of FIG. 1c;

FIG. 4 is a side elevation of a conical sieve according to the invention;

FIG. 5 is a partial cross-section taken along the line V—V of FIG. 4 on an enlarged scale;

FIG. 5a is a partial cross-section of a different embodiment taken along the line V—V of FIG. 4 on an enlarged scale;

FIG. 5b is a partial cross-section of another embodiment taken along the line V—V of FIG. 4 on an enlarged scale;

DESCRIPTION OF THE PREFERRED EMBODIMENT

Figure 2:
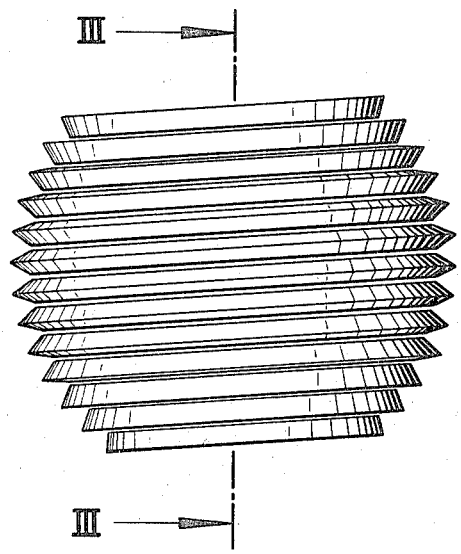
FIG. 2 is a side elevation of a barrel-shaped sieve according to the invention.

FIG. 1a shows a portion of the sieve comprising elongated profiled elements 1 mutually spaced by a distance 7 and interconnected at points equidistantly spaced along the longitudinal edges of the elements 1. Interconnecting bridges 3 divide the gap between the individual elements 1 into elongated sieving slots 6 whose length 8 is determined by appropriate selection of the distance between the interconnecting points. The surface of the elements 1, together with the interconnecting bridges 3, defines a sieving surface 2 shown in FIGS. 1aa and 1aaa, which also show the substantially triangular cross-section of the elements 1. The embodiments shown in FIGS. 1b to 1ccc differ from that shown in FIGS. 1a to 1aaa only in the particular shape of the elements 1' and 1'', the elements 1' having substantially semi-circular, and the elements 1'' substantially trapezoidal configurations.

Figure 3:
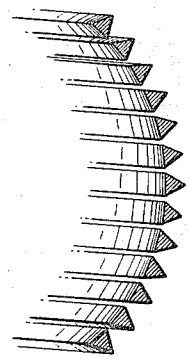
FIG. 3 is a partial cross-section taken along the line III—III of FIG. 2.
Figure 6A:
FIG. 6a is a profiled elongated element for use in a conical sieve in a front view.
Figure 6B:
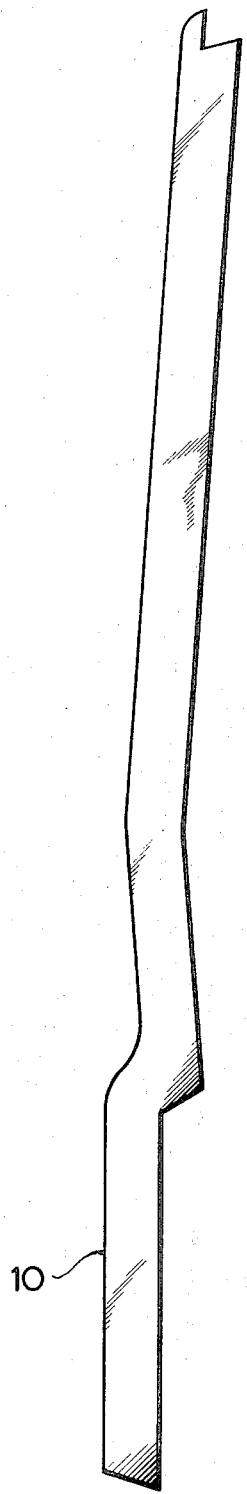
FIG. 6b is a profiled elongated element according to FIG. 6a in a side elevational view.

FIGS. 2 and 3 show a barrel-shaped sieve manufactured according to the invention, while FIGS. 4 to 5b show conical sieves whose elements 1, 1a and 1b form a planar, stepped and corrugated sieving surface 2, 2a and 2b, respectively. Finally, FIG. 6 shows an elongated profiled element 9 which is to be used for conical or frusto-conical drums and which has a shaped surface 10 and lateral sides 11 which enclose an acute angle with each other so that the element 9 is narrower at one end than at the other end. If such elements 9 are juxtaposed, the resulting shape of the sieve is substantially conical.

The sieves shown in the accompanying drawings are produced by a method according to the invention, which will be now described in connection with production of a sieve shown in FIGS. 1a to 1aaa. It is to be understood that the method described equally applies in a similar manner to any other embodiment shown.

The method according to the invention comprises, in general, the steps of providing the elements 1 with a protective layer, juxtaposing the elements so that the protective layers of any two adjacent elongated elements 1 abut each other, interconnecting the elements so as to form a sieve body, and removing the protective layers of the elements so as to create voids between the adjacent elements 1 subsequently serving as sieving slots 6.

Figure 7:
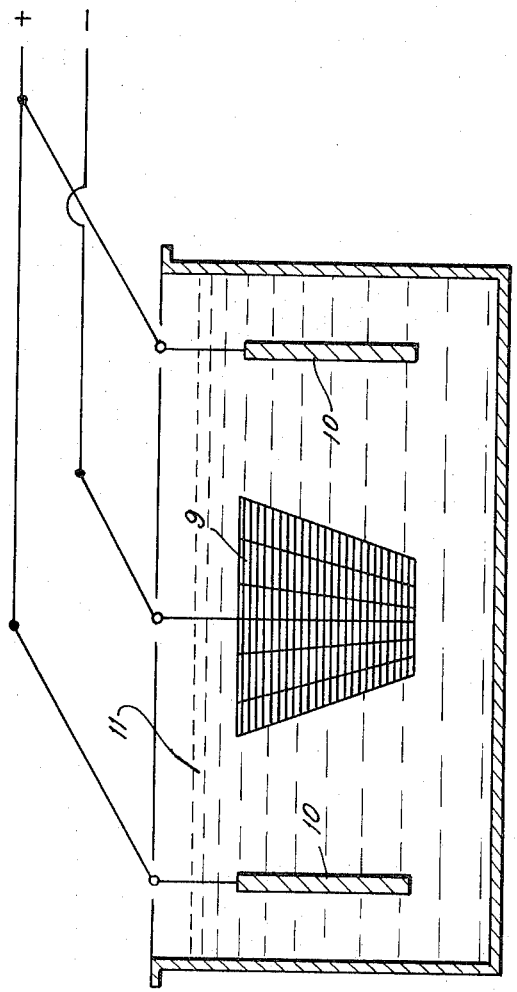
FIG. 7 is a somewhat diagrammatic, partly cross-sectional and partly side elevational view of the sieve according to FIG. 4 located in an electroplating bath.

According to one embodiment of the invention, profiled elongated wires or bars of advantageous cross-sections, such as circular, semi-circular, elliptical, triangular, rectangular, trapezoidal, multilateral or other cross-sections, are made of an electrically conductive material such as iron, steel, copper, bronze, brass, aluminum, silver or similar material, and the protective layer is made of an electrically insulating but soluble material, such as varnish or synthetic plastic material. The thickness of the protective layer is chosen so as to correspond to one-half of the width 7 of the contemplated slot 6, for instance by applying several coatings to the elements 1, or by properly choosing the concentration and consistency of the protective layer material. Once the protective layer is applied and the material thereof hardens, the coated elements 1 are arranged adjacent each other, preferably on a support having the general shape of the contemplated sieve, so that the protective layers of any two adjacent elements 1 abut each other and an uninterrupted surface is thus formed, and the elements are secured in their respective positions. Subsequently thereto, portions of the layers are removed either mechanically or chemically and the sieve body comprising the coated elements withh partially removed insulating layers is submerged into an electroplating bath where the action of the electric current deposits electrically conductive particles from the electroplating bath on the noninsulated surfaces, which eventually form the bridges 3 between the adjacent elements 1. The use and operation of electroplating baths are too well known to need detailed description. Nevertheless, for the sake of clarity, FIG. 7 shows an example of electroplating the sieve, in the illustrated embodiment a conical sieve corresponding to that shown in FIG. 2, wherein a sieve 9 is submerged in an electroplating bath 11 and is electrically connected to the positive terminal of an electric source, and electrodes 10 are also submerged in the bath and connected to the negative terminal of the source, so that the sieve, the electrolyte and the electrodes complete an electroplating circuit. In the embodiment illustrated in FIG. 1, the points at which the insulating layers are removed are arranged in columns, but this is not critical for the invention; rather, the non-insulated points may be arranged in any advantageous manner. It is also evident that the portions of the insulating layers may be removed prior to the arrangement of the elements on the support, or that the layers are interrupted from the very beginning in that the protective layers are not continuously applied. Once the interconnecting bridges 3 are formed, the thus formed sieve body is removed from the electroplating bath, and the remaining portions of the insulating layers are dissolved in an appropriate liquid of gaseous solvent, such as mineral spirit, hot air or steam. Since the thickness of the protective layers of two adjacent elements 1 amounts to the width of the contemplated slot 6, the dissolution of these layers results in creation of slots of lengths 8 and widths 7.

According to an other embodiment of the invention, the profiled elements are joined by soldering at points or along lines where the protective layer has been removed. This method assures stability of the produced sieve body without impairing the dynamical symmetry since the heat transfer to the elements is negligible as far as heat deformation of the elements is concerned. Of course, except for the interconnecting step, the method is the same.

Figure 8:
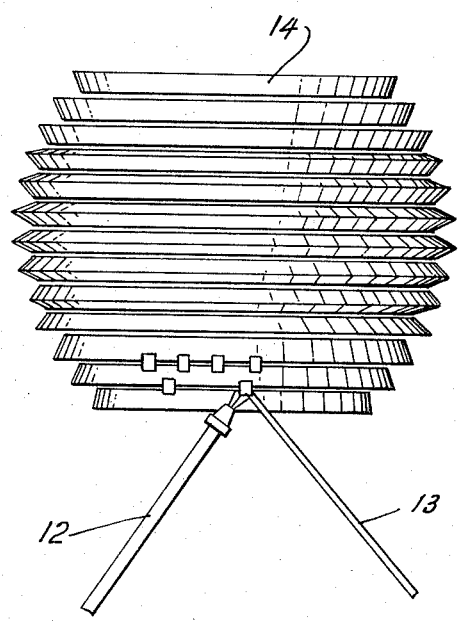
FIG. 8 is a side elevational view of the sieve according to FIG. 2 during the interconnecting step.

While the above described methods are advantageous for producing sieves from electrically conductive or other metallic materials, or elements, in some instances it is advantageous or necessary to produce such sieves from synthetic plastic materials, for instance filaments. If such is the case, the profiled elements are provided with a protective layer which is dissolvable in a medium which is not active to the material of the element, such as varnish or the like. Subsequently to the removal of portions of the protective layer by mechanical or chemical means, the elements are joined by applying an adhesive which is not dissolvable in the aforementioned medium and which is resistant to wear or abrasion during the operation of the sieve, or by thermal welding. An example of the interconnecting of the elements by applying an adhesive to the same is illustrated in FIG. 8, wherein a sieve 14 corresponding to that shown in FIG. 2 is being produced by interconnecting the elements using a material supplied by a stick 13 which is melted by a stream of hot fluid emanating from a jet 12 so as to form bridges between the adjacent elements. The other steps of the manufacturing process are, of course, similar to those described in connection with the first embodiment.

Figure 9:
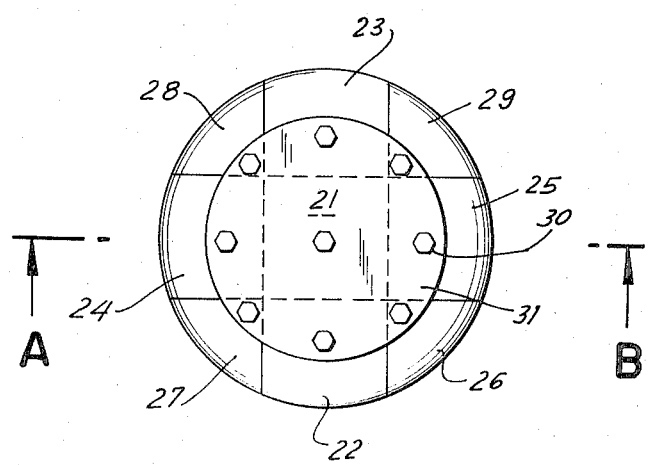
FIG. 9 is a top plan view of a support to be used in the production of the sieve according to FIG. 2.
Figure 9A:
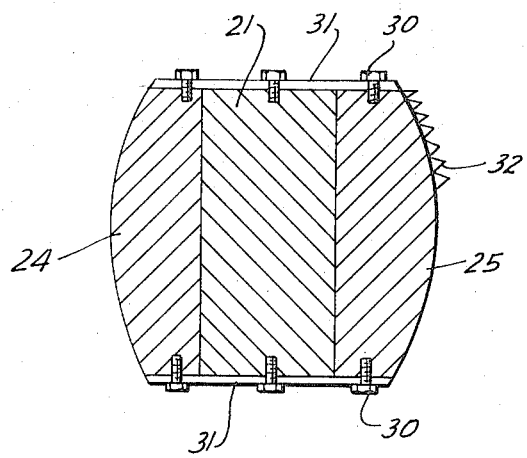
FIG. 9a is a cross-sectional view of the support of FIG. 9, taken on the line A-B of that Figure.

Experience has shown that it is particularly advantageous if the elements are arranged on a support or core which has the shape of the desired sieve, are secured thereto, joined by any of the above described methods and then the core is removed prior to or after the removal of the remaining portions of the protective layer and the attendant formation of the slots. It is to be understood that once the interconnection has been completed, the sieve body is self-supporting and thus a further attachment to the core is superfluous. While the particular construction of the core is of no importance as long as cylindrical or conical sieves are to be produced, it is clear that if more complicated shapes of sieves are desired, the core has to be removed from the interior of the sieve body. Advantageously, the core comprises two or more parts which are individually removed from the inside of the sieve through the opening which is smaller than the largest diameter of the complete core. An example of such a core is illustrated in FIGS. 9 and 9a, wherein the core is shown to consist of nine parts 21 to 29 and two attachment plates 31, the attachment plates 31 being attached to the various parts 21 to 29 of the support by screws 30. Alternately, teh core may be made of a material which is dissolvable in the same medium as the protective layers, so that it is dissolved concurrently with the dissolution of the layers.

The main advantage of the method according to the invention is to be seen in the fact that it not only makes possible the production of conventional sieves having simple shapes, but also more complicated sieves, such as barrel-shaped, stepped, frusto-conical with varying slope, or other similarly shaped sieves. The shape of the support or core is the only determining factor for the shape of the desired sieve, and there is no need for special measures which would have to be taken if such sieves were to be produced in accordance with any of the prior art methods.

While the invention has been described as using discrete profiled elements, it is equally possible to produce the sieve from a continuous wire, filament or other similar profiled material by winding the same on the core so that the consecutive helical turns abut each other with their protective layers. This method is particularly advantageous for complicated shapes of the sieve, since it disposes of exact measuring and cutting operations of the individual elements and assures continuity of the sieve, namely, the ends of each of the discrete elemens do not have to be joined together by electroplating, welding or other similar process which could result in a dynamically unbalanced sieve.

While the method according to the invention is particularly suitable for production of complicated sieves, it can also easily be used for manufacturing simple, such as cylindrical or planar sieves. It is conceivable that simple cylindrical or conical sieves may be produced by cutting out a blank of a desired shape from a planar sieve produced in accordance with the method of the invention, and by joining the edges of the blank. Even if the sieve becomes damaged, it is possible to further use the undamaged portion of the sieve in other applications.

Since the slot width of the sieve is determined by the thickness of the protective layer only, and the particular dimensions of the profiled elements have no influence on the same, it is possible to produce sieves having slot widths smaller than 0.04 millimeters while the thickness of the sieve is larger than 0.3 millimeters. While assuring faultless separation of solid and liquid components, these sieves are also of sturdy construction, being resistant to wear or abrasion by the moving solid particles and having relatively high resistance to forces acting upon the seive, mainly forces resulting from local accumulation of the substance to be separated or centrifuged.

It is of a critical importance that the sieve slots do not become clogged during the operation of the sieve by impurities carried into the sieve by the substance to be separated. It is therefore advantageous that the lateral flanks of the profiled elements are inclined in respect to the sieve surface 2, so that the slot extends in the direction away from the sieve surface. This, of course, means that the solid particles which pass through the sieve slots in their narrowest part, i.e., at the sieve surface, will not be captured anywhere else in the slot.

If metallic wires or synthetic filaments of high tensile strength are used, especially for sieves to be used in high-speed centrifuges, then a self-supporting sieve body is produced which reduces the stressing forces transmitted to the drum jacket. Consequently, the drum jacket obtains a greater stability or, on the other hand, for the same stability the drum jacket can be of less rigid construction, i.e., the walls thereof may be thinner.

In fact, if an edgewise-wound profiled element is used, the conventional support sieve can be entirely omitted, i.e. the so produced sieve is totally self-supporting. Consequently, the so produced sieve can be directly inserted into the inner space of the centrifugal drum, provided that the sieve includes discharge channels at its reverse side.

As already mentioned above, the method according to the invention renders possible production of sieves whose jacket lines are not straight lines, for instance conical sieves for centrifugal drums of continuously operating sugar centrifuges, and that such covering sieves can readily be inserted into such centrifugal drums.

It is of a particular importance to take into account the continuously changing frictional angle while centrifuging sugar filling mass in continuously operating conical centrifugal drums, caused by the varying consistency of the filling mass from fluid to solid sugar. This condition can be satisfied by a conical centrifugal drum whose jacket lines are curved or stepped, and by a cover sieve of corresponding configuration which is inserted into the centrifugal drum. It is particularly advantageous if a cover sieve is used which has a smooth sieve surface and curved or otherwise shapepd jacket lines.

As a matter of fact, the sieve according to the invention may even be of such a sturdy construction that it takes over the function of both the centrifugal drum and the cover sieve simultaneously.

It is also possible, as shown in FIGS. 5a and 5b, to arrange the profiled elements in such a manner that the sieve surface is not planar, but rather stepped or corrugated. It is evident that such corrugations will increase the sliding angle, this retarding the moving substance, such as sugar, more than a smooth surface does. Consequently, as the thickness of the sugar layer inside the drum increases, the dwell of the individual crystals of sugar in the drum increases accordingly, and the sugar crystals are more effectively separated from the moisture while the throughput of the device remains the same.

According to yet another embodiment of the invention, a conical sieve is produced from elements 9 shown in FIG. 6. As already mentioned, if such elements are juxtaposed, the resulting sieve will have a conical shape. The advantage of this embodiment is that any arbitrary desirable shape of sieve can be obtained by appropriately dimensioning the profiled element 9, i.e., even shapes whose surface lines deviate from straight lines, are curved or stepped. A still another advantage is to be seen in the fact that in this embodiment the slots extend in the direction of the surface lines, i.e., in the general direction of advancement of the mass to be centrifuged through the sieve. As a result of this, the sugar crystals advancing through the sieve are subjected to less wear at the edges of the elements. This means that the so-called rasp effect, which occurs if the slots extend perpendicularly to the advancement of the solid substance, is eliminated.

It will be understood that each of the elements described above, or two or more together, may also find a useful application in other types of constructions, differing from the types described above.

While the invention has been illustrated and described as embodied in a sieve for sugar centrifuges, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of manufacturing a slotted sieve, comprising the steps of coating each of a plurality of elongated elements with a layer of soluble material; juxtaposing said elements so that they together assume the shape of the desired sieve and so that said layers of each two adjacent elements abut one another; interconnecting said adjacent elements; and removing said layers so as to obtain between said elements respective gaps which are adapted to serve as sieve openings.

2. A method according to claim 1, comprising the additional step of removing portions of said layers in the regions of contemplated interconnection of said adjacent elements prior to the interconnecting step.

3. A method according to claim 1, wherein said elements are electrically conductive and said layers are electrically insulating, and wherein said interconnecting step consists of electroplating in a galvanic bath.

4. A method according to claim 1, wherein said elements are of synthetic plastic material.

5. A method according to claim 1, wherein said interconnecting step consists of welding.

6. A method according to claim 1, wherein said interconnecting step consists of soldering.

7. A method according to claim 1, wherein said interconnecting step consists of applying an adhesive.

8. A method according to claim 1, wherein said juxtaposing step consists of arranging said elements on a removable support having substantially the shape of the desired sieve.

9. A method according to claim 8, wherein said support has at least two parts, and further comprising a step of individually removing said parts after said interconnecting step.

10. A method according to claim 8, wherein said support is of a dissolvable material; and further comprising the step of dissolving said support after said interconnecting step.

11. A method according to claim 1, wherein said removing step consists of submerging said interconnected elements in a bath of liquid solvent.

12. A method according to claim 1, wherein said removing step consists of exposing said interconnected elements to a gaseous solvent.

13. A method of manufacturing a slotted sieve, comprising the steps of providing a plurality of elongated elements each having at least two longitudinally extending surfaces; providing a layer of soluble material on each of said elements; juxtaposing said elements so that they together assume the shape of the desired sieve and so that said layer separates the associated surfaces of each two adjacent elements; connecting said adjacent elements to one another in the regions of said associated surfaces; and removing said layers so that said associated surfaces define sieve slots between said adjacent elements.

* * * * *

UNITED STATES PATENT OFFICE
CERTIFICATE OF CORRECTION

PATENT NO. : 3,859,713
DATED : January 14, 1975
INVENTOR(S) : Bernhard Fiedler

It is certified that error appears in the above-identified patent and that said Letters Patent are hereby corrected as shown below:

On the cover sheet [73], the name of the Assignee should read -- MASCHINENFABRIK BUCKAU R. WOLF AKTIENGESELLSCHAFT --.

Signed and Sealed this twenty-sixth Day of August 1975

[SEAL]

Attest:

RUTH C. MASON
Attesting Officer

C. MARSHALL DANN
Commissioner of Patents and Trademarks